United States Patent

[11] 3,626,975

| [72] | Inventors | Gerhard Bobst<br>Oensingen;<br>Kurt Christiansen, Oberbuchsiten, both of Switzerland |
|---|---|---|
| [21] | Appl. No. | 856,270 |
| [22] | Filed | Sept. 9, 1969 |
| [45] | Patented | Dec. 14, 1971 |
| [73] | Assignee | Von Roll AG<br>Gerlafingen, Switzerland |
| [32] | Priority | Nov. 8, 1968 |
| [33] | | Switzerland |
| [31] | | 16712/68 |

[54] PRESSURE RELIEF VALVE
2 Claims, 2 Drawing Figs.

[52] U.S. Cl. .................................................. 137/494,
137/469, 137/529
[51] Int. Cl. ..................................................... F16k 31/38
[50] Field of Search ........................................... 137/469,
470, 509, 510, 494, 529

[56] References Cited
UNITED STATES PATENTS

| 2,557,536 | 6/1951 | Drane ........................ | 137/469 |
| 3,054,420 | 9/1962 | Williams ..................... | 137/469 |
| 3,282,289 | 11/1966 | Vick ............................ | 137/469 X |
| 3,389,796 | 6/1968 | Fiala ........................... | 137/509 X |

Primary Examiner—Harold W. Weakley
Attorney—Werner W. Kleeman

ABSTRACT: A novel relief valve is disclosed of the type including a spring-loaded valve plate or disc and a valve seat. The valve disc is constructed so as to include a cylindrical guide on the discharge side thereof, the cylindrical guide and valve disc forming a piston enclosed within a cylindrical cavity in which the valve spring is inserted. The cylindrical cavity communicates with the valve seat opening by means of a bore opening into the facing side of the valve disc. In this manner, pressure that is present in the valve seat opening is transferred into the cylindrical cavity thus creating a control pressure differential related to the difference in areas between the valve seat and the piston formed. The spring thus need be dimensioned only for a partial area of the valve seat opening. The construction provides the advantage that the valve disc stroke-blowoff or discharge quantity characteristic is such that the seating pressure can be varied to any desirable extent in dependence upon the stroke.

PATENTED DEC 14 1971   3,626,975

INVENTORS
GERHARD BOBST & KURT CHRISTIANSEN

BY Jacobi, Davidson & Klarman
ATTORNEYS

PRESSURE RELIEF VALVE

BACKGROUND OF THE INVENTION

This invention generally relates to valves and particularly concerns a pressure relief valve of the type having a spring-loaded valve disc disposed upon a ring-shaped valve seat so as to close off the valve seat opening.

As is known, relief valves of this general type serve to maintain a certain pressure in a hydraulic conduit system. In their simplest construction, relief valves of the prior art essentially comprise a spring-loaded valve disc or plate which is seated with pressure upon the valve seat. If the pressure in the hydraulic conduit system becomes so large that the pressure force acting upon the facing side of the valve disc is greater than the counteracting spring seating force, then the valve opens and the pressure medium is discharged or flows out of the valve seat opening until the system pressure has again been reduced to such a point that the valve spring can again seat the valve disc or plate so as to close off the valve seat opening.

The amount that the valve disc must open, i.e., the length of the valve disc stroke, depends on the discharge or blowoff volume of the pressure medium. Due to the linear characteristics of the prior art spring-loaded relief valves, the pretension and thus the spring force which acts upon the valve disc is greater when the valve disc stroke is longer than when the valve disc stroke is smaller. This means that the seating pressure of the valve is greater with a larger discharge or blowoff volume than with a smaller blowoff volume. This differential can be reduced substantially if one utilizes a valve spring having a flat characteristic, i.e., a spring having many windings. However, a construction of this type is very expensive and furthermore requires a relatively large assembly space. On the other hand, if a short, strong spring were utilized, the pressure differential associated with small and large blowoff volumes could be substantially reduced.

SUMMARY OF THE INVENTION

Thus a need exists for a relief valve which eliminates the disadvantageous seating pressure-blowoff volume characteristics of prior art constructions. It is the primary object of the instant invention to satisfy this need. Further, more specific, yet equally important objects of the instant invention concern:

the provision of a relief valve exhibiting a valve disc stroke-blowoff volume characteristic in which the seating pressure can be varied to any desirable extent in dependency upon the stroke; specifically wherein the seating pressure can be kept constant, or even decrease with the valve disc stroke;

the provision of a relief valve wherein a relatively small spring can be utilized;

the provision of a relief valve of relatively simple and inexpensive construction; and, the provision of a relief valve offering reliable operation.

These objects as well as other objects and advantages which will become apparent as the description proceeds, are implemented by the instant invention which generally comprises a relief valve of the type having a spring-loaded valve disc or plate disposed upon a valve seat so as to close off the valve seat opening. A guide means is provided on the discharge side of the valve disc, the guide means being inserted into a cylindrical cavity so as to form a piston. The spring itself is inserted within the cylindrical cavity. The cylindrical cavity communicates with the valve seat opening by means of a bore which opens into the facing side of the valve disc, this connection being provided for the purpose of transferring pressure present in the valve seat opening into the cylinder cavity. In this manner, pressure that is present in the valve seat opening is transferred into the cylindrical cavity thus creating a control pressure differential related to the difference in areas between the valve seat and the piston formed. The spring thus need be dimensioned only for a partial area of the valve seat opening. The construction provides the advantage that the valve disc stroke-blowoff or discharge quantity characteristic is such that the seating pressure can be varied to any desirable extent in dependence upon the stroke.

BRIEF DESCRIPTION OF THE DRAWINGS

The invention itself will be better understood and further features thereof will become apparent from the following detailed description of the preferred inventive embodiment, such description referring to the appended single sheet of drawings wherein.

DETAILED DESCRIPTION OF PREFERRED INVENTIVE EMBODIMENTS

Figure 1:
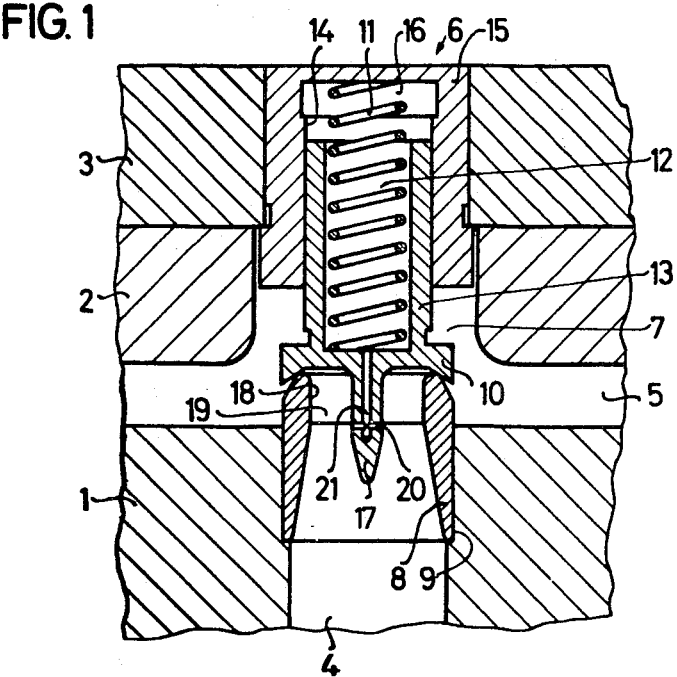
FIG. 1 depicts a relief valve for a block construction, the valve having a concave valve disc or plate.

Referring now to the Figures in the appended sheet of drawings, and particularly to FIG. 1, reference numerals 1, 2 and 3 identify component portions of a block in which a valve line 4 as well as a discharge line 5 is provided. The relief valve herein depicted is generally identified by reference numeral 6 and is disposed in a bore 7 of the block. Relief valve 6 comprises a valve seat 8 rigidly disposed at the end of the valve line 4 in portion 1 of the block. Since no pressure medium can be allowed to escape along the surface 9 between the valve seat 8 and the portion 1 of the block, valve seat 8 is preferably press-fit or adhesively secured in portion 1.

When the relief valve is in a closed position, a valve disc or plate 10 rests upon seat 8 and is pushed or pressed onto the seat means of a spring 11. The spring 11 is disposed inside a bore 12 of a preferably cylindrical guide means 13 provided on the discharge side of the valve disc 10, the guide means forming a piston which is disposed in a cylindrical bore 14 of an insert member 15. The spring 11 is inserted into the cylindrical cavity 16 and the bore 12 and is supported at the bottom of the insert member 15.

The facing side on end face of the valve disc 10 is provided with a protruding probe or extension 17 in the center thereof, the probe extending into the valve seat opening 19. The probe or extension 17 preferably has a cylindrical body, and an overall, tapered configuration by terminating forwardly in a pointed or conical top portion or tip extension. The outside surface of the probe body preferably extends parallel to the wall 18 of valve seat opening 19. A bore 20 is provided through the probe 17 and preferably extends perpendicular to the outside probe surface and thus perpendicular to the flow. This latter relationship is clearly assisted by the converging flow passageway in the valve seat upstream of valve seat opening that counteracts any deflection tendency caused by the tip extension. Bore 20 communicates with a connecting bore 21 provided internally of probe 17 which itself opens into the bore or cavity 12 thus providing a direct connection between the cylindrical cavity 16 and the valve seat opening 19.

The novel operation of the relief valve is as follows. The pressure of the pressure medium within the hydraulic conduit system and thus at line 4 and at valve seat opening 19 is transferred through bores 20 and 21 into the cylindrical cavity 16 such that the valve disc 10 is pressed upon the valve seat 18 only with such force as would correspond to the difference between the area of the valve seat opening at the facing of the valve disc 10 and the area formed by the piston 13. Spring 11 thus need be dimensioned only to compensate for a partial area of the valve seat opening.

If the valve now opens, the return or seating force of spring 11 would increase with an increasing stroke or displacement of the valve disc 10. At the same time, however, the static pressure within the valve seat opening 19 would be reduced as the blowoff or discharge volume increases. Likewise, the hydraulic pressure within cylindrical cavity 16 would decrease since such pressure is dependent only upon the static pressure present at the opening of bore 20 in the valve seat opening 19. As the blowoff or discharge volume increases, the spring force also increases while the hydraulic force aiding the spring effected by the pressure medium within cylindrical cavity 16 is reduced. However, the total pressure, static and dynamic, acting upon the facing side of the valve disc 10 remains essentially unchanged since the dynamic or deflection force of the discharging hydraulic medium upon the valve face likewise increases as the blowoff volume increases. By suitably varying the dimensions and parameters of the valve seat opening, the probe diameter, the piston diameter, and the spring characteristic to name only the most important, one can maintain any desired function between the pressure in line 4 and the blowoff or discharge volume. Thus, with the novel relief valve construction, one can effect operation such that the hydraulic system pressure reduces with increasing blowoff or discharge volume.

The narrow bores 20 and 21 within the probe 17 act as a throttle to thus provide an effective stabilizing means against valve vibration.

Figure 2:
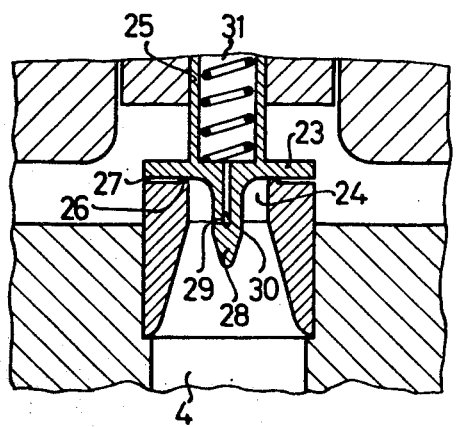
FIG. 2 depicts a relief valve for a block construction with the valve having a level or planar valve disc along with an enlarged valve seat.

Although the valve disc of FIG. 1 has been shown to be constructed concave on its facing side to thus cause a greater deflection of the emerging hydraulic jet and accordingly, a greater reactive or dynamic force, the valve disc 23 of FIG. 2 is planar or level. Valve seat 26 is provided at the inside edge of the valve seat opening 24 and is constructed as a ridge having the shape of a knife edge, for example, the ridge ending in a level surface 27 extending parallel to the facing side of valve disc 23. Probe or extension 28 also has a pointed or conical tip extension top or end surface as well as a cylindrical shaft body or sidewall. Again, a bore 29 is drilled through the probe 28 in a direction perpendicular to the outside probe surface. Bore 29 also communicates with a cylindrical cavity or bore 31 via a bore 30. The function and general operation of the modified valve in accordance with FIG. 2 is substantially identical to the operation of the valve of FIG. 1 but will vary somewhat due to the different parameters and dimensions.

Both of the exemplary embodiments depict relief valves which can be built into a block without necessitating the provision of a valve housing. Of course, it is possible to provide the novel valve with its own housing and to then secure the entire unit at a conduit or at the external bore of a block. In this regard, it is also possible to provide a means for adjusting the valve spring itself. However, if the hydraulic pressure which is to be limited is of a known value, then economic reasons dictate that the valve spring utilized for this pressure be of fixed dimension such that an adjustment is not necessary.

As should be apparent, the objects initially set forth at the outset to this specification have been successfully achieved.

Accordingly, what is claimed is:

1. A relief valve for a fluid medium comprising a valve seat means including a substantially cylindrical valve seat opening; a valve disc means having a face portion confronting and disposed on said valve seat means when sealing-off said valve seat opening; means providing a fixed substantially cylindrical cavity disposed on the discharge side of said valve disc means; guide means disposed on said valve disc means and providing a piston inserted within said cavity; valve spring means within said cavity for providing a seating pressure for said valve disc means; protruding probe means provided at the side of said face portion of said valve disc means and possessing sufficient length to still extend into said valve seat opening when said valve disc means is opened and unseated from said valve seat means, said probe means including a substantially cylindrical body extending from said face portion of said disc means, said valve seat opening and said probe body having sidewalls substantially parallel to each other, a substantially conical extension forming the tip of said probe means and merging smoothly with said body, said probe body being provided with bore means communicating in flow relationship said cylindrical cavity and the side of said face portion of said valve disc means for transferring the pressure prevailing in the flow of the fluid medium at the region of said valve seat opening into said cavity, said bore means including a mouth portion spaced from said face portion of said valve disc means and extending in a direction substantially perpendicular to the direction of flow of the fluid medium through said valve seat means, said bore means extending into said valve seat opening when said valve disc means is opened at a location of the flow of the fluid medium where such fluid medium is not substantially deflected and is substantially parallel to the sidewalls of said body, said bore means transferring substantially the total pressure of the fluid medium composed of the static pressure into said cavity when said valve disc means is seated upon said valve seat means and when said valve disc means is opened and unseated from said valve seat means said bore means transferring to said cavity still substantially only the static pressure of the fluid medium, said static pressure being equal to the total pressure when the valve disc means is closed, said total pressure being diminished by the dynamic pressure at the valve seat opening when the valve disc means is open, wherefore the static pressure when the valve disc means is open is smaller than such total pressure when the valve disc means is closed.

2. A relief valve as defined in claim 1, wherein is provided an inwardly tapered, converging flow passageway for the fluid medium upstream of said cylindrical valve seat opening, said passageway being in the region of said extension to counteract any deflection tendency of the fluid flow away from said probe means, whereby said flow is assisted in remaining substantially parallel to the walls of said body in the region of said mouth portion.

* * * * *